FIG. I

United States Patent Office 3,824,305
Patented July 16, 1974

3,824,305
ANTIBIOTIC A-287 AND PROCESS FOR PRODUCTION THEREOF
Robert L. Hamill, New Ross, and W. Max Stark, Indianapolis, Ind., assignors to Eli Lilly and Company, Indianapolis, Ind.
Filed Jan. 22, 1973, Ser. No. 325,264
Int. Cl. A61k 21/00
U.S. Cl. 424—118                                      5 Claims

ABSTRACT OF THE DISCLOSURE

Antibiotic mixture A-287, comprising microbiologically active, structurally related factors A and B, produced by cultivation of *Actinoplanes utahensis* NRRL 5614 under submerged aerobic conditions, is isolated by extraction of the broth. The individual factors are separated and isolated by chromatography and countercurrent distribution. The A-287 mixture and the individual factors have antibacterial, antifungal, parasiticidal, and growth-promoting activity.

SUMMARY OF THE INVENTION

This invention relates to antibiotic substances. In particular, it relates to an antibiotic mixture comprising two peptide antibiotics. The mixture and the individual factors are produced by culturing a hitherto undescribed strain of the organism *Actinoplanes utahensis* NRRL 5614.

The antibiotic mixture of this invention is arbitrarily designated herein as antibiotic A-287. The two individual antibiotics which have been separated and characterized are designated as antibiotic A-287 factors A and B.

The A-287 antibiotics are produced by culturing a novel strain of *Actinoplanes utahensis* NRRL 5614 under submerged aerobic fermentation conditions until a substantial level of antibiotic activity is produced. The A-287 antibiotics are extracted from the fermentation broth with a polar organic solvent, concentrating said solvent to give the antibiotic mixture as an oil, extracting this oil with an aqueous buffer having a pH of about 7, and finally extracting the antibiotic mixture therefrom with a polar organic solvent. This organic extract is evaporated to provide antibiotic A-287 which is further purified by column chromatography. The individual A-287 factors are separated from each other and isolated as individual antibiotic compounds by the use of well-known techniques, such as countercurrent distribution and thin-layer chromatography.

The A-287 antibiotics inhibit the growth of organisms which are pathogenic to animal and plant life and are particularly valuable antibiotics because of their activity against gram-positive organisms, for example, *Staphylococcus aureus* and *Streptococcus pyogenes*. In addition, antibiotic A-287 and the individual factors thereof have parasiticidal and growth-promoting activity.

DESCRIPTION OF THE DRAWINGS

The infrared absorption spectrum for antibiotic A-287 factor A is presented in the drawing as FIG. 1, and the infrared absorption spectrum of antibiotic A-287 factor B is presented as FIG. 2.

DETAILED DESCRIPTION OF THE INVENTION

The A-287 antibiotic factors of this invention are structurally related to each other and exhibit chemical, physical and spectral characteristics similar to those of peptides. These antibiotic factors are co-produced during the fermentation and are obtained as a mixture. The factors are separated from each other and isolated as individual compounds as hereinafter described. The mixture of A-287 factors is a white powder which is soluble in water and lower alcohols but is substantially insoluble in many organic solvents.

The following paragraphs describe the physical and spectral properties of the two A-287 factors which have thus far been characterized.

Antibiotic A-287 factor A is a white amorphous compound which does not melt at temperatures below about 220° C. Elemental analysis of factor A gave the following percentage composition: carbon, 44.98%; hydrogen, 6.15%; nitrogen, 10.28%; oxygen, 26.37%; and ash 4.15%.

Factor A has an apparent molecular weight in the range of 1500 (1475.73), as determined in methanol by the osmometric method on Hitachi-Perkin-Elmer's Model 115 Molecular Weight Apparatus.

Figure 1:
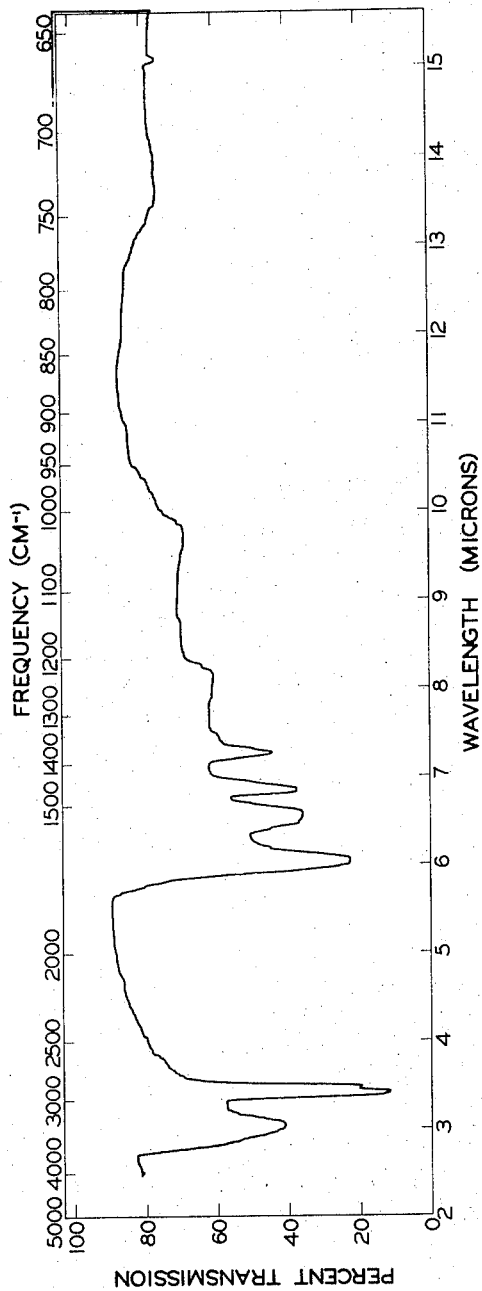

The infrared spectrum of factor A in mineral oil mull is shown in FIG. 1 of the accompanying drawings. The following absorption maxima are observed (mineral oil bands at 3.42 and 3.50 microns): 3.05 (medum), 6.05 (medium-strong), 6.59 (medium), 6.84 (medium), and 7.27 (medium) microns.

Factor A absorbs in the ultraviolet region of the spectrum and exhibits absorption maxima in water at $\lambda$ max. 220 m$\mu$ ($\epsilon$ 9,500; shoulder) and 273 m$\mu$ ($\epsilon$ 2,700); there is no shift in base or acid.

Antibiotic A-287 factor B is a white amorphous compound which does not have a distinct melting point, but which chars at about 200° C. Elemental analysis of factor B gave the following percentage composition: carbon, 49.96%; hydrogen, 6.98%; nitrogen, 9.90; oxygen, 23.86%; and ash 4.66%.

Factor B has an apparent molecular weight in the range of approximately 2800 (2781.28), as determined in methanol by the osmometric method on Hitachi-Perkin-Elmer's Model 115 Molecular Weight Apparatus.

Figure 2:
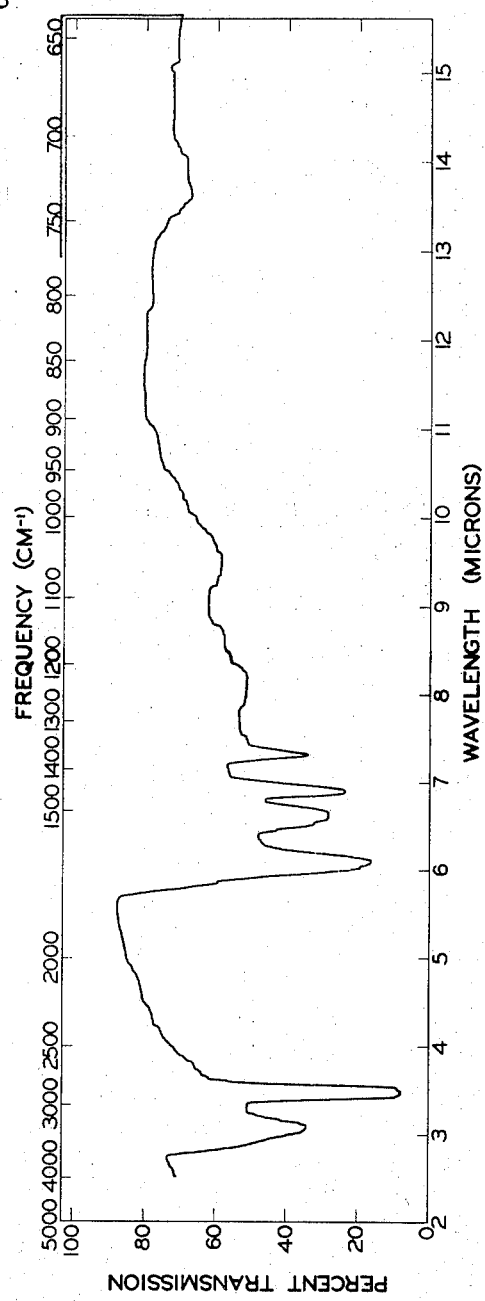

The infrared spectrum of factor B in mineral oil mull is shown in FIG. 2 of the accompanying drawings. The following absorption maxima are observed (mineral oil bands at 3.45 and 3.52 microns): 3.06 (medium), 6.09 (strong), 6.60 (medium), 6.89 (medium), and 7.30 (medium) microns.

Factor B absorbs in the ultraviolet region of the spectrum and exhibits absorption maxima in water at $\lambda$ max. 220 m$\mu$ ($\epsilon$ 9,200; shoulder) and 273 m$\mu$ ($\epsilon$ 3,200); there is no shift in acid or base.

Electrometric titration of the A-287 factors showed a constant consumption of base which is an indicative feature of cyclic peptides.

The A-287 factors and mixtures thereof are substantially soluble in water and in lower alcohols, such as butanol and methanol. They are insoluble in many organic solvents such as, for example, diethyl ether.

Antibiotic A-287 factors A and B have the following $R_f$ values in the paper-chromatographical systems indicated below, using *Bacillus subtilis* ATCC 6633, *Sarcina lutea* ATCC 9341, or *Staphylococcus aureus* ATCC 6538 as detection organisms:

| Solvent system | $R_f$ value Factor A | $R_f$ value Factor B |
|---|---|---|
| Butanol saturated with water | 0.17 | 0.88 |
| Butanol saturated with water plus 2% p-toluenesulfonic acid (p-TSA) | 0.70 | 0.88 |
| Butanol saturated with water plus 2% p-TSA and 2% piperidine | 0.39 | 0.90 |
| 80% ethanol with 1.5% NaCl. Paper is impregnated with solution of 0.95 M Na₂SO₄ and 0.05 M NaHSO₄. H₂O | 0.72 | 0.86 |
| Methanol: 0.1 N HCl (3:1) | 0.68 | 0.89 |

Amino-acid analyses of antibiotic A-287 factors A and B were very similar, each giving the approximate ratios shown below:

| Amino acid: | Approximate ratio |
|---|---|
| Serine | 1 |
| Glutamic acid | 1 |
| Glycine | 2 |
| Alanine | 1 |
| Valine | 2 |
| Cysteine | 1 |
| Isoleucine | 1 |
| Leucine | 2 |
| Tryptophan | 1 |
| Unknown | 2 |

Antibiotic A-287 and the individual factors thereof inhibit the growth of microorganisms that are pathogenic to animals and plants. In addition, antibiotic A-287 and its individual factors have parasiticidal and growth-promoting activity.

The antibiotic mixture and the individual factors are especially active against pathogenic gram-positive bacteria, both *in vitro* and *in vivo*, and can be employed in the treatment and control of diseases caused by these organisms.

Listed in Table I which follows are the minimal inhibitory concentrations (MIC) of A-287 factors A and B for several illustrative organisms, as determined by standard agar-dilution testing.

TABLE I

| | MIC (γg./ml.) | |
|---|---|---|
| Organism | Factor A | Factor B |
| *Staphylococcus aureus* | 6.25 | 12.5 |
| *Staphylococcus albus* | 6.25 | 6.25 |
| *Bacillus subtilis* | 12.5 | 3.13 |
| *Mycobacterium avium* | 100.0 | 12.5 |
| *Proteus vulgaris* | 50.0 | 50.0 |
| *Shigella paradysenteriae* | 100 | 25 |
| *Brucella bronchiseptica* | 100 | 12.5 |
| *Vibrio metschnikovii* | 50 | 25.0 |
| *Erwinia amylovora* | 100 | 100 |
| *Agrobacterium tumefaciens* | 100 | 100 |
| *Xanthomonas malvacearum* | 50 | 50 |
| *Xanthomonas phaseoli* | 25 | 25 |
| *Pseudomonas solanacearum* | 50 | 6.25 |
| *Pseudomonas syringae* | 100 | 100 |
| *Corynebacterium insidiosum* | 100 | 100 |
| *Alternaria oleracea* | 25 | 12.5 |
| *Ceratostomella fimbriata* | 50 | 50 |
| *Glomerella singulata* | 100 | 100 |
| *Pullularia sp* | 25 | 12.5 |
| *Verticillium albo-atrum* | 100 | 100 |

Antibiotic A-287 factor B is present in minor quantities in the A-287 antibiotic mixture. As shown in Table I, the *in vitro* activity patterns of A-287 factors A and B are quite similar. Thus, it is not essential to separate the two factors when they are employed in the treatment and control of disease organisms or as growth promotants. In the tests which follow, antibiotic A-287 refers to the A-287 antibiotic mixture, which consists of approximately 95-98 percent factor A and approximately 2-5 percent factor B.

The acute toxicity of antibiotic A-287, determined by intraperitoneal administration in mice and expressed as $LD_{50}$, is 1370 mg./kg. No deaths occurred when antibiotic A-287 was given orally to mice at 1250 mg./kg.

*In vivo* antimicrobial action was observed when antibiotic A-287 was given either parenterally or orally to mice. The $ED_{50}$ values (effective dose, protecting 50 percent of the test animals when two doses are employed) in illustrative infections are given below:

| | Subcutaneous, mg./kg. | Oral, mg./kg. |
|---|---|---|
| *Staphylococcus aureus* | 50 | |
| *Streptococcus pyogenes* | 1 | 400 |
| *Diplococcus pneumoniae* | 25 | |

Another useful property of antibiotic A-287 is its ability to improve growth performance in animals. When A-287 was added to the diet of growing chicks at a level of 45.4 grams per ton, the average weight gain after 10 days was 159.9 grams, as compared with an average weight gain of 146.1 grams for the control group. The feed-conversion efficiency (feed/gain) for chickens fed antibiotic A-287 was 1.43; in contrast, the feed conversion efficiency for the control group was 1.52.

The ability of antibiotic A-287 to stimulate weight gains makes it especially useful for improved livestock production. When used as a growth-promoting agent, it is convenient to incorporate suitable concentrations of the antibiotic into the normal food ration of the animals. Antibiotic A-287 typically is effective as a growth-promoting agent when administered to animals at levels of from about 10 to about 1,000 grams per ton of feed ration.

In another aspect of this invention, antibiotic A-287 is a parasiticidal agent. In particular, A-287 is effective in the treatment of relapsing fever caused by the spirochete *Borrelia novyi*. In a test procedure described by M. C. McCowen, M. E. Callender, J. F. Lawlis, Jr., and M. C. Brandt in *Amer. J. Trop. Med. Hyg.* 2, 212-218 (1953), mice are inoculated with the relapsing fever spirochete and are treated with test compound after six hours. Blood samples are taken after 24 and 48 hours and are examined for presence of the spirochete. Effective control of *Borrelia* was obtained with intraperitoneal administration of 10 mg./kg. of antibiotic A-287.

For protection against parasites such as *Borrelia* antibiotic A-287 is typically effective when administered parenterally to animals in a dosage range of from about 10 to about 500 mg./kg.

As is apparent from foregoing properties, antibiotic A-287 is useful for suppressing the growth of pathogenic organisms. In addition to applications described hereinabove, A-287 may also be employed as a surface disinfectant. Solutions containing as little as two percent of the antibiotic are effective for disinfecting purposes. Such solutions, preferably also containing a detergent or other cleansing agent, are useful for disinfecting objects such as glassware, dental and surgical instruments, and surfaces such as walls, floors, and tables in areas where maintenance of sterile conditions is important, i.e. hospitals, food-preparation areas, and the like.

The novel antibiotics of this invention are produced by culturing an A-287-producing strain of an *Actinoplanes* organism under submerged aerobic conditions in a suitable culture medium until the culture medium contains substantial antibiotic activity. The antibiotics are recovered by employing various isolation and purification procedures commonly used and understood in the art.

The microorganism useful for the preparation of antibiotic A-287 is a species of the genus *Actinoplanes* of the family *Actinoplanaceae*. The *Actinoplanaceae* family of microorganisms is of the order *Actinomycetales*, having been described first by Couch [*J. Elisha Mitchell Sci. Soc.*, 65, 315-318 (1949); 66, 87-92 (1950); *Trans. New York Acad. Sci.*, 16, 315-318 (1954); *J. Elisha Mitchell Sci. Soc.*, 71, 148-155 and 269 (1955); "Bergey's Manual of Determinative Bacteriology," 7th Edition, 825-829 (1957); *J. Elisha Mitchell Sci. Soc.*, 79, 53-70 (1963)].

The *Actinoplanes* culture useful for the production of antibiotic A-287 has been deposited without restriction and made a part of the stock culture collection of the Northern Utilization Research and Development Division, U.S. Dept. of Agriculture, Peoria, Ill. 61604, from which it is available to the public under the number NRRL 5614.

The A-287-producing culture has been classified taxonomically by Dr. Paul J. Szaniszlo as a new strain of *Actinoplanes utahensis* Couch. The methods employed in these taxonomic studies are similar to those recommended by the International *Streptomyces* Project along with other supplementary tests commonly used in taxonomy [E. B.

Shirling and D. Gottlieb: "Methods for Characterization of *Streptomyes* Species." *International Bull. Systemic Bacteriol.*, *16*, 313–340 (1966)].

MORPHOLOGY

Vegetative Mycelium

The hyphae on synthetic and semisynthetic agar media are long, branched, septate and 0.2 to 1.2 μm. in diameter. On the surface of the agar, the mycelia form a compact, slightly raised and somewhat leathery growth. No aerial hyphae are formed on any media. Vertical hyphae are present in abundance just below the surface of the agar. Each vertical hypha originates from horizontal substrate hyphae found in abundance more deeply in the agar and terminates on the surface of the agar with the formation of a sporangium.

Sporangia

Sporangia are formed in abundance on Czapek-solution agar (Difco Laboratories, Detroit, Mich.). They appear after about seven days of incubation at 22–25° C. As the colony ages, the whole surface of the colony becomes covered with a dense sporangial mat. The sporangia are borne singly on very short sporangiophores (terminal portion of vertical hyphae above agar surface). Occasionally a sporangiophore branches to give rise to a second or rarely a third sporangium. The sporangia are typically spherical or subspherical in shape and may be as large as 8 to 10 μm. The sporangia contain about 35 to 50 subspherical sporangiospores which are arranged in one or more prominent coils in the sporangium. The sporangiospores are approximately 1.0 μm. in diameter at maturity. Sporangial dehiscence appears to be by the almost total disintegration of the sporangial wall. Ten or 15 minutes after sporangia are placed in water the process of spore liberation usually begins. The spores are usually not immediately motile, but become actively motile by means of a tuft of polar flagella in about five minutes.

APPEARANCE ON MEDIA

Czapek-Solution Agar

Good growth; a point inoculum produces a colony about 1 cm. in diameter in four weeks. No aerial hyphae are observed. The colony is generally flattened with a slight central mound. The colony color is bright orange at first, turning to dull orange when sporangia form and cover the mycelia.

Peptone Czapek-Solution Agar

Fair growth; a point inoculum produces a colony about 0.5 cm. in diameter in four weeks. No aerial hyphae are observed. The colony is generally flat, diffuse, and slightly mucoid. The colony color is a dull brownish orange. No sporangia are produced.

Anio-Henssen Agar

Fair growth; a point inoculum produces a colony about 0.5 cm. in diameter in four weeks. No aerial hyphae are observed. The colony is "mountain-like," having a sharp peak at the center with sharp ridges protruding to the edge of the colony. The colony color is bright orange to yellow orange. Sporangia are formed in large numbers in the older part of the colony, but not to the extent that they are produced on Czapek-solution agar.

CELL-WALL CHEMISTRY

*Actinoplanes utahensis* NRRL 5614 possesses a cell-wall chemistry most similar to strains of *Actinoplanes utahensis* (Szaniszlo and Gooder, 1967). Automatic amino-acid and amino-sugar analyses of cell-wall residues remaining after 18 hours of hydrolysis with 1 ml. of 6 N hydrochloric acid at 100° C. revealed that glucosamine, muramic acid, glycine, alanine and 2,6-diamino-3-hydroxypimelic acid (HDAP) are present in the walls in large concentrations. 2,6-Diaminopimelic acid (DAP) is detected in lower concentration. A comparison of the cell-wall amino-acid molar ratios (glutamic acid considered as unity) of *Actinoplanes utahensis* NRRL 5614 and *A. utahensis* (Szaniszlo and Gooder) is presented in Table II.

TABLE II

| Organism | Amino Acids | | | | |
|---|---|---|---|---|---|
| | Glutamic | Glycine | Analine | HDAP | DAP |
| *Actinoplanes utahensis*, NRRL 5614 | 1.00 | 1.14 | 0.74 | 0.61 | 0.15 |
| *Actinoplanes utahensis* (Szaniszlo and Gooder) | 1.00 | 1.18 | 0.93 | 0.53 | 0.11 |

Paper-chromatographic analyses of residues remaining after two hours of hydrolysis with 2 ml. of 2 N sulfuric acid at 100° C. revealed that the monosaccharides glucose, galactose, mannose, arabinose, xylose, and rhamnose are present in the cell walls in detectable amounts. These sugars are found generally in the cell walls of strains of *A. utahensis*.

CULTURE CHARACTERISTICS ON VARIOUS AGAR MEDIA
[Incubation temperature of 30° C.]

| Medium | Veg. myc., amount | Aerial morphology or sporulation | Reverse color M. & P. code,[1] ICNB name [2] |
|---|---|---|---|
| Glucose asparagine | 4+ | Sporangia; no aerial mycelia observed. | 10C7, moderate yellowish pink. |
| Emerson's | 4+ | No sporangia; no aerial mycelia observed. | 11B12, strong orange. |
| Bennett's | 3+ | Sporangia; no aerial mycelia observed. | 12C7, light brown. |
| Tomato-paste oatmeal | 1+ | No sporangia; no aerial mycelia observed. | No color assignment. |
| Czapek's | 3–4+ | Sporangia; no aerial mycelia observed. | 13D7, light brown. |
| Nutrient | 2+ | No sporangia; no aerial mycelia observed. | 11B2, pale yellow. |
| Tyrosine | 2+ | do | 13B7, light brown. |
| Oatmeal | 3+ | Sporangia; slight "bloom" | 12C3, grayish yellow. |
| Glycerol glycine | 4+ | No sporangia; slight "bloom" | 12B9, brownish orange. |
| Yeast extract | 4+ | Sporangia; slight "bloom" | Do. |
| Inorganic salts starch | 3–4+ | Heavy with sporangia; slight "bloom." | 12A9, brownish orange. |
| Glycerol asparagine | 4+ | do | 9C8, medium orange. |
| Calcium malate | 4+ | No sporangia; slight "bloom" | Do. |
| Yeast-extract malt-extract | | Sporangia; slight "bloom" | |

[1] Refers to A. Maerz and M. Rea Paul, "A Dictionary of Color," McGraw-Hill, New York, N.Y.
[2] The ISCC-NBS Method of Designating Colors and a "Dictionary of Color Names," National Bureau of Standards Circular 553, U.S. Government Printing Office.

Based on the foregoing taxonomic description of the A-287-producing strain, the organism has been classified as a novel strain of *Actinoplanes utahensis* Couch. The A-287-producing organism differs slightly from *Actinoplanes utahensis* Couch as described by Couch in *J. Elisha Mitchell Sci. Soc. 79*, 53-66 (1963). On Czapek-solution agar the new strain produces abundant sporangia and is bright orange to dull brownish orange in color, whereas the published organism produces "none to few" sporangia and is brilliant apricot orange in color. This color variation is also noted on peptone Czapek agar. A color difference of light brown (new strain) versus orange (published description) is observed on tyrosine agar. These differences, however, are merely strain differences; in all other respects the characteristics are in agreement with the published description of that species.

As previously mentioned, *Actinoplanes utahensis* NRRL 5614 can be grown in a culture medium to produce the A-287 antibiotics. The culture medium can be any one of a number of media; however, for economy of production, maximum yield, and ease of isolation of the antibiotics, certain culture media are preferred. Thus, for example, molasses is one of the preferred sources of carbohydrate; and soybean meal is one of the preferred nitrogen sources.

Nutrient inorganic salts should be incorporated in the culture medium and can include the customary salts capable of yielding sodium, potassium, ammonium, calcium, phosphate, chloride, sulfate, acetate, carbonate, and like ions. Additionally, sources of growth factors, such as distiller's solubles and yeast extracts, can be included with beneficial results.

As is necessary for the growth and development of other microorganisms, essential trace elements should also be included in the culture medium for growing the *Actinoplanes* sp. employed in this invention. Such trace elements are commonly supplied as impurities incidental to the addition of other constituents of the medium.

The initial pH of the culture medium can be varied. Prior to inoculation with the organism, however, it is desirable to adjust the pH of the culture medium to between pH 6.8 and 7.5, depending upon the particular medium employed. The final pH is determined, at least in part, by the initial pH of the medium, the buffers present in the medium, and the period of time for which the organism is permitted to grow.

Preferably, submerged aerobic fermentation in tanks is used for production of substantial quantities of the A-287 antibiotics. Small quantities of antibiotic are obtained by shake-flask culture. Because of the time lag in antibiotic production commonly associated with the inoculation of large tanks with the spore form of the organism, it is preferable to use a vegetative inoculum. The vegetative inoculum is prepared by inoculating a small volume of culture medium with the spore form or mycelial fragments of the organism to obtain a fresh, actively growing culture of the organism. The vegetative inoculum is then transferred to a larger tank. The medium used for the growth of the vegetative inoculum can be the same as that employed for larger fermentations, but other media can be employed.

The A-287-producing organism can be grown at temperatures between about 20° and about 35° C. Optimum A-287 production appears to occur at a temperature of about 30° C.

As is customary in aerobic, submerged culture processes, sterile air is blown through the culture medium. For efficient growth of the organism and production of the A-287 antibiotics, the volume of air employed in the tank production of the A-287 antibiotics preferably is above 0.1 volume of air per minute per volume of culture medium. Optimum growth occurs when the volume of air employed is between 0.6 and 1 volume of air per minute per volume of culture medium.

The production of antibiotics can be followed during the fermentation by testing samples of the broth for antibiotic activity against organisms known to be sensitive to the antibiotics. One assay organism useful in testing the antibiotics of the present invention is *Sarcina lutea* ATCC 9341. The bioassay is conveniently performed by paper-disc assay on agar plates.

Generally, maximum antibiotic production occurs within two to six days in either large-tank or shake-flask fermentation. Commonly, maximum production of antibiotic activity is realized within twenty to ninety-six hours.

Following their production under submerged aerobic fermentation conditions, the A-287 antibiotics previously described can be recovered from the fermentation broth by methods commonly employed in the fermentation art. The antibiotic activity produced during fermentation of the A-287-producing organism occurs in the antibiotic broth. Accordingly, isolation techniques employed in the production of A-287 antibiotics are designed to permit maximum recovery of the antibiotics from the broth. Thus, for example, mycelia and undissolved solids are removed from the fermentation broth by conventional means, such as filtration; and the A-287 antibiotics are recovered from the filtered broth by techniques such as extraction or absorption.

Under the conditions employed thus far, the *Actinoplanes* strain described previously and designated as NRRL 5614 produces antibiotic factor A as the predominant factor. In general, factor A accounts for about 95 to 98 percent of the total recovered antibiotic activity. Factor B accounts for substantially the remainder of the antibiotic activity.

Lower alcohols such as, for example, butanol and pentanol are suitable solvents for extracting the filtered broth. Further purification of the A-287 antibiotics includes additional extraction and absorption procedures. Absorptive materials such as Sephadex G-25 or G-50, alumina and the like can be advantageously employed.

Antibiotic factors A and B are separated from each other and are isolated as individual compounds by the use of well-known methods such as countercurrent distribution, preparative thin-layer chromatography, column chromatography and the like. For example, preparative-thin-layer chromatography over silica gel with butanol:acetic acid:water (4:1:1) was used to separate factors A and B, recovering each by elution with methanol. For large-scale separations, column chromatography is advantageous. Representative adsorbents for column separations include: (1) alumina, eluting factor B with methanol and A with 2% ammonia in methanol; (2) DEAE cellulose, by gradient elution with 0.001 M to 0.2 M sodium acetate buffer of pH 5.6; and (3) cation-exchange resin (XE-64 in the hydrogen cycle), eluting with 0.05 M citrate buffer with a gradient variation in pH of from 5.2 to 5.8. Countercurrent distribution is a preferred method of separation. Good results are achieved with this method if one phase is a polar, water-immiscible solvent, or solvent mixture, and the other phase is a buffer solution having a pH in the range of from about 5.0 to about 8.5. Optimum results are achieved when one phase is a solvent system such as, for example, methyl isobutyl ketone: butanol or ethyl acetate: ethanol and the other phase is a buffer solution having a pH in the range of from about 6.8 to about 7.0.

In order to illustrate more fully the operation of this invention, the following examples are provided.

EXAMPLE 1

A. Shake-flask Fermentation of A-287

A culture of *Actinoplanes utahensis* NRRL 5614 was prepared and maintained on an agar slant having the following composition:

| Ingredient: | Amount, g. |
| --- | --- |
| Oatmeal (precooked) | 65 |
| Agar | 20 |
| Deionized water, q.s. 1 liter. | |

The slant was inoculated with *Actinoplanes utahensis* NRRL 5614 and incubated at 30° C. for ten to fourteen days. A pigment was produced in the mycelia that varied from orange to orange-brown. The culture does not normally sporulate on this medium; it is necessary, therefore, to macerate the mycelial mat with a flattened, sharpened inoculating needle in order to increase the number of potential growth centers. The macerated mature culture was covered with sterile water and was scraped carefully with a sterile rod to obtain a mycelial suspension. This suspension was preserved by lyophilization. One-sixth of a slant culture so prepared was used to inoculate 50 ml. of a vegetative medium having the following composition:

| Ingredient: | Amount, g. |
|---|---|
| Oatmeal (precooked) | 20.0 |
| Tryptone | 5.0 |
| Dried yeast | 2.5 |
| Deionized water, q.s. 1 liter. | |

The initial pH of the vegetative medium was approximately 7.2; after 72 hours the pH was approximately 6.6–7.0. The vegetative medium was inoculated and incubated in a 250-ml. flask at 30° C. for 72 hours on a rotary shaker operating at 250 r.p.m. The terminal solids (representing growth) were 20–30 percent.

B. Tank Fermentation of A–287

The vegetative medium (1.25 l.), prepared as described above, was used to inoculate 25 liters of sterile production medium of the following composition:

| Ingredient: | Amount, g. |
|---|---|
| Sucrose | 10.0 |
| Soybean flour | 10.0 |
| Molasses | 30.0 |
| Enzymatic hydrolysate of casein | 4.0 |
| $K_2HPO_4$ | 1.0 |
| $MgSO_4$ | 1.0 |
| Dow Corning antifoam | 0.2 |
| Czapek's mineral mixture,* 5.0 ml. | |
| Tap water, q.s. 25 liters. | |

*Czapek's mineral mixture has the following composition:

| Ingredient: | Amount |
|---|---|
| KCl | 100 g. |
| $MgSO_4 \cdot 7H_2O$ | 100 g. |
| $FeSO_4 \cdot 7H_2O$ | 2 g. (dissolved in 2 ml. conc. HCl.). |
| Deionized water | 1 liter. |

The pH of the medium was 7.2 after sterilization by autoclaving at 120° C. for thirty minutes at 15–20 pounds pressure. In a 30-liter fermentation tank, the inoculated production medium was allowed to ferment for five days at a temperature of 30° C. The fermentation medium was aerated with sterile air at the rate of 1 volume of air per volume of culture medium per minute and was stirred with conventional agitators at 400 r.p.m.

EXAMPLE 2

The A–287 antibiotics were produced according to the process of Example 1, but utilizing an agar-slant medium having the following composition:

| Ingredient: | Amount, g. |
|---|---|
| Oatmeal (precooked) | 60.0 |
| Yeast | 2.5 |
| Agar | 20.0 |
| $K_2HPO_4$ | 1.0 |
| Czapek's mineral mixture, 5.0 ml. | |
| Fermentation solubles* | 5.0 |

*BY 500 from a butanol fermentation; available from Commercial Solvents Corp., Terre Haute, Ind.

EXAMPLE 3

Isolation of the A–287 Antibiotic Factors

The fermentation broth (approximately 25 liters), obtained as reported in Example 1, was filtered with a filter aid (Hyflo Super-Cel, a diatomaceous earth sold by Johns-Manville Products Corp.). The broth filtrate was adjusted to approximately pH 6.5 with dilute hydrochloric acid and then was extracted twice with 1-butanol. The butanol extract was concentrated under vacuum to give an oil. This oil was dissolved in sodium phosphate buffer (0.1 M, pH 7.0), and the buffer solution was extracted three times with 1-butanol. The butanol extract was evaporated under vacuum to dryness. The residue was dissolved in methanol; ether was added to precipitate the antibiotic mixture. The precipitate was separated by centrifugation and dried *in vacuo* to give a tan powder (approximately 50–65 percent yield from the original filtrate). This residue was further purified and decolorized by chromatography over Sephadex G–25 in water. After purification by chromatography, the active material was again precipitated from methanol, using ether and separating as above, to give three grams of A–287 antibiotic mixture.

Antibiotic A–287 factors A and B were separated by countercurrent distribution, using fifteen 500-ml. separatory funnels with 250 ml. of each phase and moving the lower phase. The upper phase was methyl isobutyl ketone: 1-butanol (3:2), and the lower phase was 0.1 M sodium phosphate buffer pH 6.8. Factor A moved with the lower phase; factor B remained in the upper phase of the first funnel. Evaporation under vacuum gave 0.1 g. of factor B. Factor A was recovered from the buffer phase by extraction with 1-butanol. The butanol extract was evaporated to dryness under vacuum. The residue thus obtained was dissolved in methanol, and ether was again used to precipitate 2.9 g. of factor A.

We claim:
1. The antibiotic A–287 factor A which
   (a) is a white amorphous compound;
   (b) does not melt below about 220° C.;
   (c) has an approximate elemental composition of 44.98 percent carbon, 6.15 percent hydrogen, 10.28 percent nitrogen, 26.37 percent oxygen and 4.15 percent ash;
   (d) has an apparent molecular weight in the range of 1500 (1475.73), as determined in methanol by the osmometric method on Hitachi - Perkin - Elmer's Model 115 Molecular Weight Apparatus;
   (e) in mineral oil mull has an infrared absorption spectrum as shown in FIG. 1 of the accompanying drawings;
   (f) in water absorbs in the ultraviolet region of the spectrum with maxima as follows:

λ max. 220 mµ (ε 9,500; shoulder)
   λ max. 273 mu (ε 2,700);

(g) is generally soluble in lower alcohols and in water;
   (h) is generally insoluble in many organic solvents;
   (i) has an approximate ratio of amino acids as follows:

serine (1), glutamic acid (1), glycine (2), alanine (1), valine (2), cysteine (1), isoleucine (1), leucine (2), tryptophan (1) and unknown (2);

(j) has the following $R_f$ values in the paper chromatographic systems indicated below, using *Bacillus subtilis* ATCC 6633, *Sarcina lutea* ATCC 9341 or *Staphylococcus aureus* ATCC 6538 as detection organisms:

| Solvent system: | $R_f$ value |
|---|---|
| Butanol saturated with water | 0.17 |
| Butanol saturated with water plus 2% *p*-toluenesulfonic acid (*p*-TSA) | 0.70 |
| Butanol saturated with water plus 2% piperidine | 0.39 |
| 80% ethanol with 1.5% NaCl. Paper is impregnated with soln. of 0.95 M $Na_2SO_4$ and 0.05 M $NaHSO_4 \cdot H_2O$ | 0.72 |
| Methanol: 0.1 N HCl (3:1) | 0.68 |

2. The antibiotic A-287 factor B which
   (a) is a white amorphous compound;
   (b) chars at about 200° C.;
   (c) has an approximate elemental composition of 49.96 percent carbon, 6.98 percent hydrogen, 9.90 percent nitrogen, 23.86 percent oxygen and 4.66 percent ash;
   (d) has an apparent molecular weight in the range of 2800 (2781.28), as determined in methanol by the osmometric method on Hitachi-Perkin-Elmer's Model 115 Molecular Weight Apparatus;
   (e) in mineral oil mull has an infrared absorption spectrum as shown in FIG. 2 of the accompanying drawings;
   (f) in water absorbs in the ultraviolet region of the sepctrum with maxima as follows:
   $\lambda$ max. 220 m$\mu$ ($\epsilon$ 9,200; shoulder)
   $\lambda$ max. 273 m$\mu$ ($\epsilon$ 3,200)
   (g) is generally soluble in lower alcohols and in water;
   (h) is generally insoluble in many organic solvents;
   (i) has an approximate ratio of amino acids as follows:
   serine (1), glutamic acid (1), glycine (2), alanine (1), valine (2), cysteine (1), isoleucine (1), leucine (2), tryptophan (1) and unknown (2);
   (j) has the following R$f$ values in the paper chromatographic systems indicated below, using *Bacillus subtilis* ATCC 6633, *Sarcina lutea* ATCC 9341 or *Staphylococcus aureus* ATCC 6538 as detection organisms:

| Solvent system | R$_f$ value |
|---|---|
| Butanol saturated with water | 0.88 |
| Butanol saturated with water plus 2% *p*-toluenesulfonic acid (*p*-TSA) | 0.88 |
| Butanol saturated with water plus 2% *p*-TSA and 2% piperidine | 0.90 |
| 80% ethanol with 1.5% NaCl. Paper is impregnated with soln. of 0.95 M Na$_2$SO$_4$ and 0.05 M NaHSO$_4$·H$_2$O | 0.86 |
| Methanol: 0.1 N HCl (3:1) | 0.89 |

3. The method for producing antibiotic A-287 comprising factor A as defined in Claim 1 or factor B as defined in Claim 2 which comprises cultivating *Actinoplanes utahensis* NRRL 5614 in a culture medium containing assimilable sources of carbohydrate, nitrogen and inorganic salts under submerged aerobic fermentation conditions until a substantial amount of antibiotic activity is produced by said organism in said culture medium, and separating the A-287 antibiotic mixture from said culture medium.

4. The method of Claim 3 which includes the step of separating factor A from the A-287 antibiotic mixture.

5. The method of Claim 3 which includes the step of separating factor B from the A-287 antibiotic mixture.

References Cited

Miller, the Pfizer Handbook of Microbiaz metabolites, McGraw-Hill Book Co., Inc., New York, N.Y. 1961 p. 118.

JEROME D. GOLDBERG, Primary Examiner